United States Patent Office 3,583,952
Patented June 8, 1971

3,583,952
PROCESS FOR POLYMERIZING
DODECANOLACTAM
Harry McGrath, Manchester, England, assignor to Imperial Chemical Industries Limited, London, England
No Drawing. Filed Feb. 6, 1969, Ser. No. 797,248
Claims priority, application Great Britain, Feb. 12, 1968, 6,817/68
Int. Cl. C08g 20/10
U.S. Cl. 260—78          15 Claims

ABSTRACT OF THE DISCLOSURE

Improved process for polymerizing dodecanolactam, using sulphonic acids as catalysts and carbonate esters or N-acyl lactams as co-catalysts. Monofunctional compound acting as a chain stopper, particularly monobasic carboxylic acids and N-substituted amides, can also be used if desired.

---

This invention relates to a process for the polymerization of lactams, and more particularly to an improved process for the polymerization of dodecanolactam.

According to the present invention an improved process for the polymerization of dodecanolactam comprises effecting the polymerization in the presence of a catalytic amount of an organic sulphonic acid and additionally a catalytic amount of a carbonate ester or an N-acyl lactam.

The organic sulphonic acids which may be used are hydrocarbon sulphonic acids, including arylsulphonic acids for example benzene, p-toluene or β-naphthalene sulphonic acid, alkylsulphonic acids for example ethylsulphonic acid, and cycloalkylsulphonic acids for example cyclohexanesulphonic acid. Monosulphonic acids are preferred.

Suitable amounts of organic sulphonic acid are for example from 0.1 to 3% by weight of the dodecanolactam. In general, amounts greater than 1% do not cause any great increase in catalytic effect.

Suitable amounts of the carbonate ester or N-acyl lactam are for example from 0.1 to 1.0% by weight, preferably 0.25 to 1% by weight, of the dodecanolactam.

N-acyl lactams which are especially suitable for use in the process of the invention are those in which the acyl group is derived from an aliphatic carboxylic acid preferably of low molecular weight, particularly acetic acid. Specific examples are N-acetyl caprolactam and N-acetyldodecanolactam. N-acyldodecanolactams, particularly N-acetyldodecanolactam give the best results. If desired an N-actyl lactam can be formed in situ from dodecanolactam by adding a small amount of an acylating agent, for example, acetic anhydride, which reacts with a minor proportion of the dodecanolactam.

Carbonate esters are of the formula:

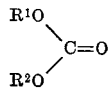

wherein $R^1$ and $R^2$ each independently represent monovalent organic radicals which are attached to the oxygen atom through a carbon atom of said radical. $R^1$ and/or $R^2$ may for example represent alkyl radicals (preferably lower alkyl radicals or 1–4 carbon atoms) cycloalkyl radicals, aralkyl radicals or monocyclic aryl radicals. As specific examples of the said esters there may be mentioned diphenyl carbonate, dimethyl carbonate, methyl ethyl carbonate, di-n-butylcarbonate and dicyclohexyl carbonate.

The process of the invention results in the production of polyamides in much higher yield than are obtained by carrying out the polymerization of the dodecanolactam in the presence of only the organic sulphonic acid. Moreover the present process is particularly advantageous in that it enables the polymerization of dodecanolactam to be effected, in good yield, at lower temperatures and/or for shorter heating periods than are required in the prior art processes, thus resulting in the formation of polyamides containing less degraded material, which is produced by heating polyamides for prolonged periods at high temperatures.

Thus it may be carried out for example in presence of water and at temperatures of 280° to 300° C., if desired in a closed vessel. It is desirable for the heating to be carried out under an oxygen-free atmosphere, for example under nitrogen or carbon dioxide to avoid discolouration of the polymer. Alternatively, the polymerization process may be carried out under anhydrous conditions, for example in a vessel from which all air and water have been removed by boiling a suitable solvent, e.g. toluene, in the vessel, or by evacuating the vessel and flushing with inert gas, e.g. nitrogen. Temperatures of 250–280° C. may be used for the polymerization under anhydrous conditions.

If desired polymerization may be carried out by the process of the invention in the presence of monofunctional compounds which, by acting as chain stoppers, control the molecular weight of the product. Monobasic carbonic acids, e.g. acetic acid or stearic acid may be used. Certain amides may also be used as monofunctional compounds, as will be indicated below.

When polymerization has been effected the product may be washed with water or methanol to remove unreacted monomer and catalysts.

According to a further feature of the invention a preferred process for the manufacture of polydodecanolactam comprises heating dodecanolactam in the presence of a catalytic amount of an organic sulphonic acid, additionally a catalytic amount of a carbonate ester or an N-acyl lactam, and an N-substituted amide, especially an N-substituted amide of the formula:

wherein $R_3$ and $R_4$ each represent alkyl, cycloalkyl or aryl radicals and may be the same or different.

Examples of aryl radicals which may be represented by $R_3$ in the above formula are phenyl, p-tolyl and β-naphthyl. Similarly examples of alkyl radicals are methyl, ethyl, n-propyl, n-butyl and an example of a cycloalkyl radical is cyclohexyl.

Specific examples of amides of the above formula include acetanilide, benzanilide, N-butylbenzamide and N-acetylbutylamine.

Especially preferred amides are those in which one of the radicals $R_3$ and $R_4$ is an aryl radical, the other being aryl, alkyl (especially lower alkyl, that is to say an alkyl radical of not more than 5 carbon atoms) or cycloalkyl.

In the preferred process of our invention the amide acts as a chain stopper and effectively controls the degree of polymerization which is achieved. To produce polydodecanolactam suitable for spinning into fibres, or for use as a moulding material, the amount of amide used should be from 1.0 to 5.0 moles (preferably from 0.25 to 1.5) percent of the dodecanolactam. Higher amounts of amide reduce the molecular weight of the polydodecanolactam so much that the product is no longer useful for the production of fibres, and lower amounts lead to products of such high molecular weights as to cause extrusion difficulties.

As a measure of the degree of polymerization produced by the process of the invention, we have relied upon determinations of the relative viscosity of a 1% by weight solution of the methanol-extracted polymer in m-cresol at 25° C. In order for polydodecanolactam to be useful for spinning into fibres it is desirable that the relative viscosity of the methanol extracted polymer in m-cresol should be within the range 1.8 to 3.4 and that the percentage by weight of methanol-extractable material in the crude polymer should be less than 5%, preferably less than 1%.

The invention is illustrated but not limited by the following examples in which the parts and percentages are by weight:

EXAMPLE 1

A mixture of 70 parts of dodecanolactam, 0.7 part of p-toluenesulphonic acid, 0.35 part of diphenylcarbonate and 5 parts of water is polymerized for 6 hours at 250° C. under an atmosphere of nitrogen. The yield of polyamide is 98% compared with a yield of only 59% when the 0.35 part of diphenylcarbonate is omitted.

EXAMPLE 2

A mixture of 70 parts of dodecanolactam, 0.7 part of p-toluenesulphonic acid, 0.35 part of N-acetyldodecanolactam and 5 parts of water is polymerized for 3 hours at 280° C. under an atomsphere of nitrogen. The yield of polyamide is 98%. When the 0.35 part of N-acetyldodecanolactam is omitted, it is necessary to extend the time of heating to 6 hours in order to obtain the same yield of polyamide.

EXAMPLE 3

A mixture of 70 parts of dodecanolactam, 0.7 part of ethylsulphonic acid, 0.3 part of acetic anhydride and 40 parts of toluene is heated for 3 hours at 280° C. The yield of polymer is 98.5%. Its relative viscosity in m-cresol (1%) solution is 2.9.

In place of ethylsulphonic acid in this example, cyclohexylsulphonic acid or naphthalene-β-sulphonic acid may be used.

EXAMPLE 4

A mixture of 70 parts of dodecanolactam, 0.7 part of p-toluenesulphonic acid, 0.35 part of N-acetyl-dodecanolactam and 40 parts of toluene is heated for 6 hours at 250° C. The yield of polymer is 71.3%. Its relative viscosity in m-cresol (1% solution) is 3.59.

When N-acetylcaprolactam is used in place of N-acetyldodecanolactam the yield is 64.8% and the relative viscosity of the polymer is 2.6.

EXAMPLE 5

70 parts of dodecanolactam, 0.7 part of p-toluenesulphonic acid, 0.35 part of di-n-butylcarbonate and 40 parts of toluene are heated for 3 hours at 280° C. The yield of polymer is 99%.

In place of di-n-butylcarbonate there may be used dimethylcarbonate or dicyclohexylcarbonate.

EXAMPLE 6

70 parts of dodecanolactam, 0.7 part of p-toluenesulphonic acid, 5 parts of water, 0.7 part of stearic acid and 0.35 part of N-acetyldodecanolactam are heated for 3 hours at 282° C. under an atmosphere of nitrogen. The polymer yield is 98%. Its relative viscosity in m-cresol (1% solution) is 2.24.

When the N-acetyldodecanolactam is replaced by diphenyl carbonate a similar yield of polymer is obtained, having a relative viscosity of 2.84.

Stearic acid in this example functions as a chain stopper. In its place there may be used acetanilide, n-butylbenzamide, benzanilide or benzoylpiperidine.

We claim:

1. A process for the manufacture of a polydodcanolactam which comprises heating dodecanolactam with from 0.1 to 3.0 percent of its weight with a catalyst comprising a hydrocarbonmonosulfonic acid, and from 0.1 to 1.0 percent of its weight of a co-catalyst selected from the class consisting of N-acyl lactams in which the acyl group is derived from an aliphatic carboxylic acid and carbonate esters having the following general formula:

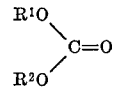

wherein $R^1$ and $R^2$ each independently represent alkyl, cycloalkyl, aralkyl or monocyclic aryl radicals.

2. Process according to claim 1 wherein the amount of co-catalyst is from 0.25 to 1.0% of the weight of the dodecanolactam.

3. Process according to claim 1 wherein the N-acyl lactam is an N-acetyl lactam.

4. Process according to claim 3 wherein the N-acyl lactam is N-acetyldodecanolactam.

5. Process according to claim 4 wherein the N-acetyldodecanolactam is formed in situ form dodecanolactam by adding acetic anhydride.

6. Process according to claim 1 wherein the carbonate ester is diphenyl carbonate.

7. Process according to claim 1 wherein the carbonate ester is di-n-butyl carbonate.

8. Process according to claim 1 carried out in the presence of water and at a temperature of from 280° to 300° C.

9. Process according to claim 1 carried out under anhydrous conditions and at a temperature of from 250° to 380° C.

10. Process according to claim 1 carried out in the presence from 0.1 to 1.5 moles percent of a monofunctional compound which functions as a chain stopper said compound being selected from the class consisting of monobasic carboxylic acids and N-substituted amides of the formula:

wherein $R_3$ and $R_4$ each represent alkyl, cycloalkyl or aryl radicals and may be the same or different.

11. Process according to claim 8 carried out in the presence from 0.1 to 1.5 moles percent of a monofunctional compound which functions as a chain stopper said compound being selected from the class consisting of monobasic carboxylic acids and N-substituted amides of the formula:

wherein $R_3$ and $R_4$ each represent alkyl, cycloalkyl or aryl radicals and may be the same or different.

12. Process according to claim 9 carried out in the presence from 0.1 to 1.5 moles percent of a monofunctional compound which functions as a chain stopper said compound being selected from the class consisting of monobasic carboxylic acids and N-substituted amides of the formula:

wherein $R_3$ and $R_4$ each represent alkyl, cycloalkyl or aryl radicals and may be the same or different.

13. Process according to claim 10 wherein the monofunctional compound which functions as a chain stopper is selected from the class consisting of acetic acid, stearic acid, acetanilide, benzanilide, N-butylamide, or N-acetylbutylamide.

14. Process according to claim 11 wherein the monofunctional compound which functions as a chain stopper is selected from the class consisting of acetic acid, stearic acid, acetanilide, benzanilide, N-butylamide, or N-acetylbutylamide.

15. Process according to claim 12 wherein the monofunctional compound which functions as a chain stopper is selected from the class consisting of acetic acid, stearic acid, acetanilide, benzanilide, N-butylamide, or N-acetylbutylamide.

References Cited

UNITED STATES PATENTS

| 2,893,980 | 7/1959 | Ham et al. | 260—78 |
| 2,910,457 | 10/1959 | Temin et al. | 260—78 |
| 3,359,227 | 12/1967 | Amann et al. | 260—78 |

WILLIAM H. SHORT, Primary Examiner

L. M. PHYNES, Assistant Examiner